United States Patent [19]

Arnold

[11] Patent Number: 4,604,522

[45] Date of Patent: Aug. 5, 1986

[54] METHOD AND APPARATUS FOR LOGGING A BOREHOLE EMPLOYING DUAL RADIATION DETECTORS

[75] Inventor: Dan M. Arnold, Houston, Tex.

[73] Assignee: Halliburton Company, Duncan, Okla.

[21] Appl. No.: 668,530

[22] Filed: Nov. 5, 1984

[51] Int. Cl.$^4$ .......................... G01V 5/08; G01V 5/10
[52] U.S. Cl. .................................... 250/264; 250/266; 250/269
[58] Field of Search ............... 250/264, 265, 266, 262, 250/269; 364/422

[56] References Cited

U.S. PATENT DOCUMENTS 3,701,902 10/1972 Janssen et al. ...................... 250/265
4,297,575 10/1981 Smith et al. ......................... 250/265

OTHER PUBLICATIONS

"Dual Porosity CNL Count Rate Processing", SPE 11146, H. Scott, C. Flaum and H. Sherman (paper presented at the 57th Annual Fall Technical Conference and Exhibition of the Society of Petroleum Engineers of AIME, Sep. 26-29, 1982).

Primary Examiner—Carolyn E. Fields
Attorney, Agent, or Firm—William J. Beard

[57] ABSTRACT

The disclosure relates to a method and apparatus for logging a borehole. A sonde having a source of penetrating radiation and at least two longitudinally-spaced radiation detectors is passed within a borehole. Count rate data is produced by each of the detectors and is continuously compared to predetermined count rate relationships which may be obtained from detectors operating in reference standard boreholes. In accordance with this count rate data comparison, the suitability of either the "ratio" or "spine/rib" analytical method is determined and the appropriate technique is automatically applied to produce an indication of a logged parameter such as formation porosity, selectively compensated for a borehole environmental condition such as variations in borehole diameter.

20 Claims, 5 Drawing Figures

METHOD AND APPARATUS FOR LOGGING A BOREHOLE EMPLOYING DUAL RADIATION DETECTORS

BACKGROUND OF THE INVENTION

This invention relates to the art of geophysical prospecting in general and to the art of radioactivity well logging in particular. Specifically, the invention relates to such logging wherein radiation scattered by a borehole environment and surrounding earth formations is analyzed to provide indications of certain pre-selected borehole and earth formation characteristics.

Radioactivity well logging conventionally employs penetrating radiation of two varieties: gamma rays and neutrons. In many well logging techniques, a source of radiation and dual radiation detectors mounted within the logging sonde are used. These two detectors are longitudinally-spaced in a logging sonde. The detectors detect radiation emitted by the source and scattered back to the sonde by the borehole environment and surrounding earth formation. Four-detector dual porosity compensated neutron logging systems are also known in the prior art. One four-detector system is discussed in H. Scott, C. Flaum and H. Sherman, Dual Porosity CNL Count Rate Processing, SPE 11146 (paper presented at the 57th Annual Fall Technical Conference and Exhibition of the Society of Petroleum Engineers of AIME, Sept. 26-29, 1982). This four detector system uses two longitudinally-spaced thermal neutron detectors and two longitudinally-spaced epithermal neutron detectors to detect scattered radiation. Each pair of detectors provides an indication of borehole and formation characteristics.

In the two-detector system, as disclosed in U.S. Pat. No. 4,297,575 issued to H. Smith et al and assigned to Haliburton Co., signals produced by the two radiation count rate detectors, one of which is closer to a source of radiation in a sonde than is the other, are comparatively analyzed to provide indications of certain wellbore characteristics, such as formation bulk density and porosity. Additionally, the detector signals may be interpreted to provide indications of borehole environment conditions such as casing and cement thickness, salinity, tool stand-off, mudcake thickness, mud weight, and variations in borehole diameter.

Two basic prior art techniques are used to process dual detector count rate data. These techniques are commonly referred to as the "ratio" and "spine/rib" methods. The ratio method utilizes the ratio of detector responses to determine the parameter of interest. If the logging tool or sonde is calibrated in a reference "standard" well, and if the count rates produced by the two detectors are affected by the same proportion in non-standard environmental conditions, the ratio of count rates will tend to cancel the adverse effects of the non-standard environmental conditions. This technique is used in dual thermal neutron porosity logging. If, however, non-standard environmental conditions vary the count rates in each detector by different proportions, as when variations in borehole diameter vary the detector count rates, the spine/rib method may be more effective in determining borehole and environmental characteristics. Spine/rib analysis may be performed by plotting values obtained from the respective radiation detectors operating in the non-standard condition on a graph of values obtained from the sonde operating in known reference standard boreholes. The data obtained from the reference standard is referred to as the "spine", whereas the effect of non-standard environmental conditions is reflected in spine-intersecting lines referred to as "ribs". The point of intersection of a rib with the spine provides an indication of a corrected logging datum, for example, formation porosity.

Difficulties may be encountered when the spine/rib method produces ambiguous results in some borehole environments and earth formations that are evaluated in a single pass of a logging sonde through a borehole.

Moreover, the ratio method is not the preferred technique in some borehole environments and earth formations because it cannot account for borehole environmental and earth formation effects that are non-proportional.

Accordingly, it is an object of the present invention to provide a well-logging apparatus and method which combines the advantages of the spine/rib and ratio techniques.

It is another object of the present invention to provide a well-logging apparatus and method which automatically and continuously selects an appropriate analytical technique in accordance with the count rate data provided by the radiation detectors.

It is still another object of the present invention to provide a well-logging apparatus and method that accurately and unambiguously evaluates borehole and earth formations in a single pass of a well-logging sonde through a borehole.

These and other objects and advantages of the present invention will become apparent from the detailed description that follows.

BRIEF DESCRIPTION OF THE PREFERRED EMBODIMENT

The present invention concerns a well logging system which is capable of measuring well-logging parameters such as formation porosity compensated where appropriate for one or more non-standard borehole environmental conditions, such as borehole diameter, casing and cement thickness, mud weight, mudcake thickness, salinity, and tool standoff. In particular, formation bulk density and porosity may be determined and compensated for such non-standard conditions by spine and rib analysis when detector count rates exceed predetermined threshold values. When either or both detector count rates are less than the respective detector threshold value, a ratio method of data analysis is automatically employed.

In a preferred embodiment, a downhole well logging instrument or sonde is provided with a radiation source and two longitudinally-spaced radiation detectors located at different distances from the source. Measurements of the radiation count rate at each radiation detector are made while passing the sonde through a well borehole. By appropriately combining the count rates of the radiation scattered to each of the two detectors according to pre-determined relationships, comparing the count rates to predetermined threshold values for each of the two detectors, and selectively applying an appropriate analytical method to the count rate data, selectively corrected measurements may be made of the earth formation and borehole in the vicinity of the radiation source and the detectors. The "ratio" and "spine/rib" methods are the analytical methods applied to the count rate data in order to compensate for environmental effects in the borehole and surrounding earth formations. Changes in the method utilized will occur automatically and repetitively within a given well as a function of the respective measured detector count rate values. Simultaneous graphical plots or data compilations of the formation bulk density and other parameters of interest are recorded as a function of borehole depth.

The borehole logging techniques of the present invention are applicable to any system which contains a source of penetrating radiation and at least two detectors of penetrating radiation which respond differently to borehole environmental conditions due to the difference in the longitudinal position of the detectors. The spine/rib correction method may further be used to quantify the environmental factor for which correction is sought.

These and other objects and features of the invention will become apparent from the claims and from the following description when read in conjunction with the accompanying drawings.

BRIEF DESCRIPTION OF THE PREFERRED EMBODIMENT

Figure 1:
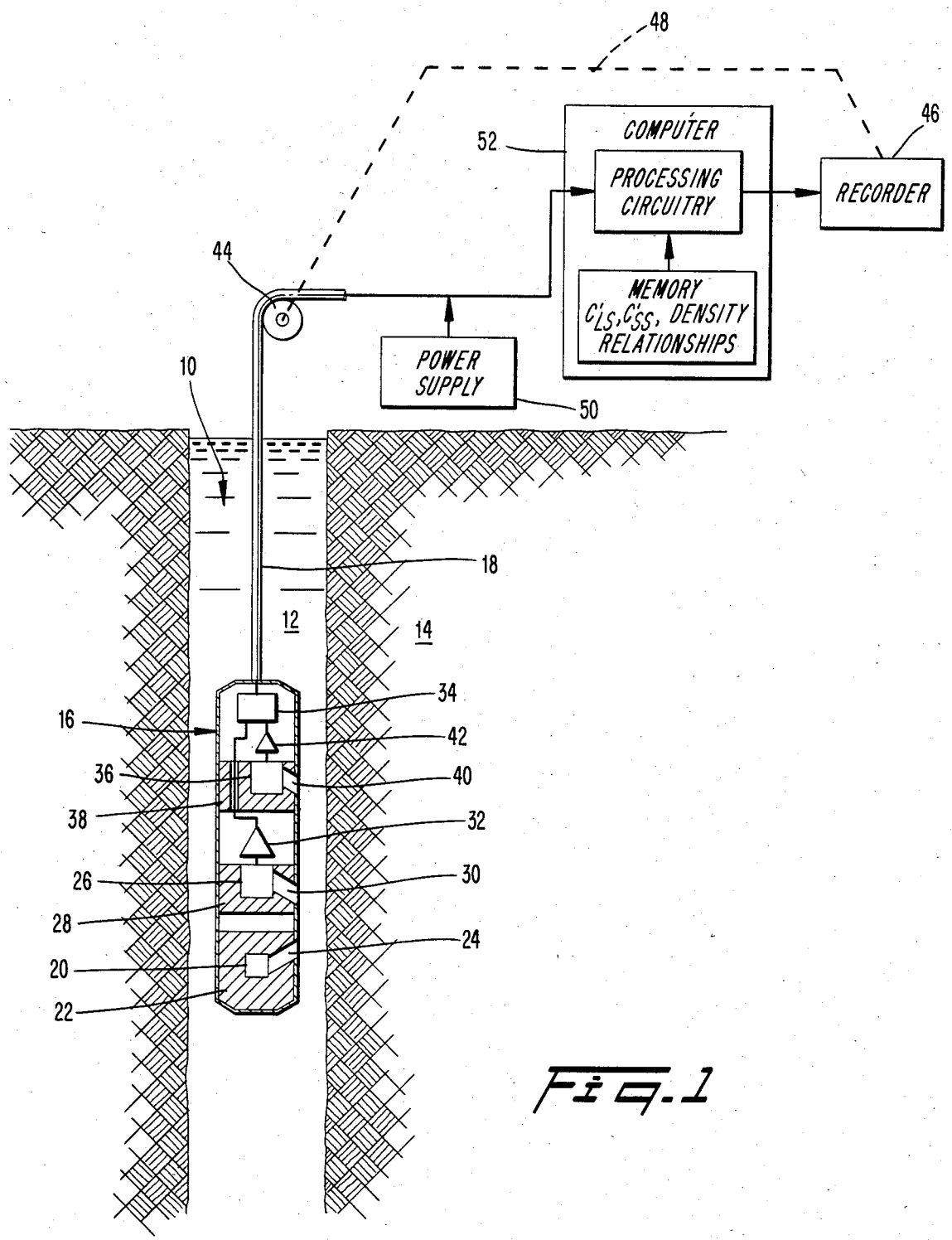
FIG. 1 is a schematic illustration showing a well logging system in accordance with the concepts of the present invention.

With reference to FIG. 1, a well logging system in accordance with concepts of the present invention is illustrated schematically. A well borehole 10 filled with a borehole fluid 12 is shown penetrating an earth formation 14. A well logging instrument or sonde, indicated generally by the numeral 16, is suspended in the borehole 10 by well logging cable 18 of the conventional armored type used in the art.

The well logging sonde 16 contains near the lower end thereof a source 20 of penetrating radiation. In preferred embodiments, the source may be a neutron source surrounded by radiation shielding material 22 having a channel or collimator 24 therein for directionally emitting radiation into the surrounding wellbore and formation. A natural radioisotope, such as a radium-beryllium source of energetic neutrons may be used to continuously irradiate earth formations 14 with high energy neutrons. Alternatively, a Deuterium-Tritium or Deuterium-Deuterium neutron generator of a type known in the art may be employed.

Longitudinally spaced from the radiation source 20 in the vertical plane of the borehole 10 is a first short spaced radiation detector 26. The detector 26 may be surrounded by radiation shielding material 28 having a channel or collimator 30 contained therein for permitting passage to the detector 26 of radiation scattered from the borehole 10 and earth formation 14. The scattered radiation detected by detector 26 may be thermal neutrons, epithermal neutrons, or gamma rays which result from thermal neutron capture. In instances where a gamma ray source is used, the detected radiation may be scattered gamma radiation. It is understood that the terms "high energy", "epithermal" and "thermal" are commonly used throughout the well logging industry to indicate generally the energy level of neutrons. The term "high energy" is used generally to designate neutrons having energy of 100 ev or greater, the term "epithermal" is used generally to designate neutrons having an energy of 0.025 ev.–100 ev., and the term "thermal" generally designates neutrons having energy of approximately 0.025 ev. The detector 26 may be a conventional transducer of radiation capable of converting incident gamma rays and/or neutrons into electrical signals. A conventional sodium iodide scintillation counter may be employed to detect scattered gamma rays. Such a counter, coated with boron trifluoride, may be employed to detect neutrons. Impingement upon detector 26 of radiation scattered by the borehole 10 and earth formations 14 causes electrical signals to be generated by the detector, which signals may be amplified down-hole by an amplifier 32 and transmitted to the surface by means of a cable driver circuit 34 and the well logging cable 18.

A second longitudinally-spaced radiation detector 36 is spaced a greater distance from the source 20 than is detector 26 and is surrounded by radiation shielding material 38 having formed therein a collimator or channel 40 that allows for passage to detector 36 of radiation scattered from the borehole 10 or earth formations 14. Detector 36 may comprise a conventional transducer or scintillation crystal coated with boron trifluoride. As with detector 26, impingement upon detector 36 by scattered radiation results in electrical signals that may be amplified down-hole by an amplifier 42 and transmitted to the cable driver circuit 34 for transmission to the surface by means of the well logging cable 18.

The well logging sonde 16 is suspended within the borehole 18 by well logging cable 18 that may pass over a sheave wheel 44 located on the surface of the earth. Revolution of the sheave wheel 44 may be either electrically or mechanically coupled to a well logging recorder 46, as indicated by the dotted line 48. Coupling of the sheave wheel to the recorder in this fashion enables measurements conducted by the sonde 16 to be recorded as a function of borehole depth.

A power supply 50 located at the surface provides power for the operation of the well logging instrument 16 by way of conductors located within the well logging cable 18. It is understood by those skilled in the art that the logging instrument contains appropriate equipment for converting the power provided by the power supply 50 to appropriate voltages for use by the detectors 26, 36, amplifiers 32, 42 and cable driving circuitry within the sonde 16.

A computer 52 comprising memory and processing circuitry is located at the surface. Signals from detectors 26, 36 are conveyed to this computer in the manner discussed above. These signals may be distinguished from one another by the computer 50 from the polarity of their respective voltage pulses. Stored in the memory of the computer are threshold count rate values for each of the detectors 26, 36. Detector 26, which is closer to the radiation source 20 then is detector 36, is referred to as the short-spaced detector of the sonde 16. Each count rate indicated by this detector is registered by the computer as $C_{SS}$, wherein "C" represents count rate and "SS" designates the short-spaced detector. Similarly, detector 36, referred to as the long-spaced detector because of its proximity to the source 20, produces an indication of the nuclear count rate that is registered by the computer 52 as $C_{LS}$, wherein "C" represents count rate and "LS" designates the long-spaced detector 36. The respective count rates $C_{SS}$, $C_{LS}$ represent discrete paired count rates obtained by the respective detectors at substantially the same time and sonde location in the borehole. As will be discussed in greater detail below, threshold values $C'_{SS}$, $C'_{LS}$, for the respective detectors 26, 36 represent count rate values below which the spine/rib method of count rate interpretation is not applied. Count rates from each detector are continuously sent to the computer and compared to the values $C'_{SS}$, $C'_{LS}$ stored in the computer memory. The relationship of each detector count rate of the count rate pair $C_{SS}$, $C_{LS}$ to the respective threshold count rate values $C'_{SS}$, $C'_{LS}$ determines the manner in which the count rate signals are manipulated, i.e., ratio or spine/rib method. When either $C_{SS}$ or $C_{LS}$ is less than its corresponding threshold value, the ratio method is employed to analyze the count rate data obtained for the particular borehole or formation parameter. This determination of the proper count rate analytical procedure, along with other determinations detailed below, is performed continuously by the processing circuitry of the computer 52.

The computer 52 may be employed to continuously evaluate the count rate data provided by the detectors 26, 36 and selectively apply the proper data correction method. This computer may comprise a small general purpose digital computer, such as the model 1602 manufactured by ROLM Corporation of Santa Clara, Calif. The various corrected parameters are supplied from the computer 52 to well logging recorder 46 in order to record the respective borehole and formation parameters as a function of borehole depth.

Figure 2:
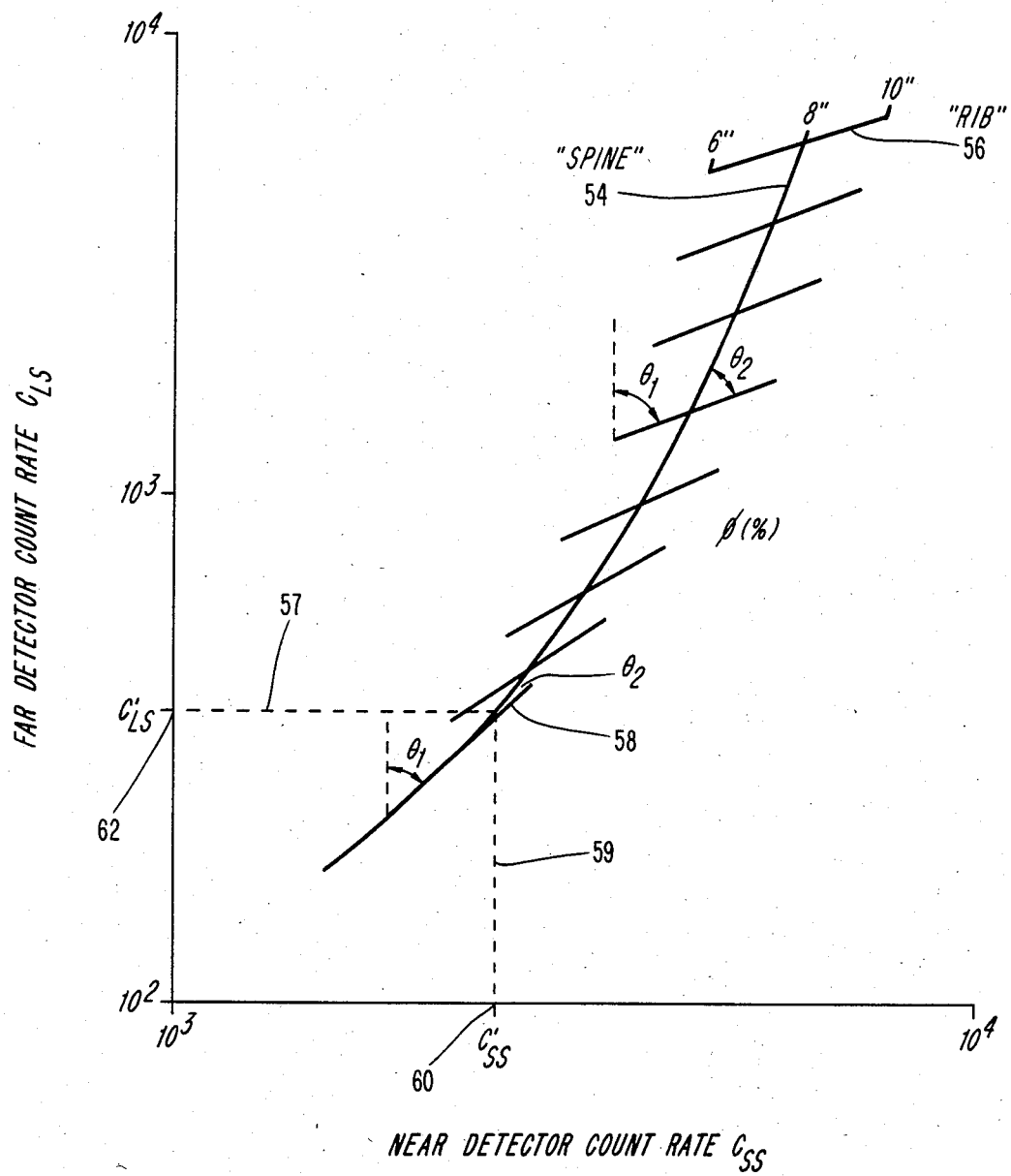
FIG. 2 is a graphical illustration relating formation porosity to count rate data, showing an array of "ribs" corresponding to environmental corrections for variations in borehole diameter.

FIG. 2 depicts a representation of the graphical relationship of a borehole environmental condition, borehole diameter, to formation porosity ($\phi$) as determined from a two-detector compensated log in accordance with the present invention. The "spine" 54 is comprised of a series of paired values $C_{SS}$, $C_{LS}$ obtained from reference "standard" 8-inch boreholes. Traversing the spine are a plurality of short graphs or lines, which lines are formed from paired count rate values $C_{SS}$, $C_{LS}$ corresponding to boreholes in which the diameters range from 6 to 10 inches. These spine-traversing lines are referred to as "ribs". The ribs 56 provide a correction for wellbore diameter deviations from the normal wellbore that permit determination of, as depicted in this graph, formation porosity. It will be apparent that the correction may be made without directly measuring the diameter of the borehole at the location being logged. However, this diameter may be indirectly approximated form the values $C_{SS}$, $C_{LS}$ and the graph of FIG. 2. Similar graphical relationships exist for the determination of formation bulk density, casing and cement thickness, borehole salinity, tool standoff, mudcake thickness and mud weight.

Two relevant angles may be determined for each spine/rib graphical relationship. An angle $\theta_1$ indicates the angle of the rib 56 relative to the vertical axis of the graph. An angle $\theta_2$ indicates the acute angle between the rib 56 and a tangent to the spine at the point of intersection between the rib and spine. It will readily be observed that for particular curved spine and rib configurations the rib and spine may touch at more than one point. In these situations, an ambiguity is introduced into the analysis. For example, as shown in FIG. 2, such ambiguities exist in the box bounded by dotted lines 57 and 59.

When $\theta_1 \approx 45°$, the ratio method is applicable for determining the corrected value of bulk density or porosity $\phi$ because the rib graph indicates that a variation in borehole diameter affects the count rates in both detectors by about the same proportion. As the angle $\theta_1$ deviates from 45°, increasing amounts of correction will be required for the parameters determined by the ratio method. For appreciable deviation of $\theta_1$ from 45°, the spine/rib method is preferable if and only if $\theta_2$ does not approach 0°. From the example in FIG. 2, it can be seen that when $\theta_2$ approximately equals 0°, the rib may not be distinguishable from the spine and the spine/rib method is not applicable. Threshold count rate values $C'_{SS}$ 60, $C'_{LS}$ 62, which represent count rates below which $\theta_2 \approx 0°$, are depicted on the graph. When count rates $C_{SS}$ and $C_{LS}$ are both less than $C'_{SS}$ 60 and $C'_{LS}$ 62, respectively, the ratio method must be used to determine the borehole size correction.

Figure 3:
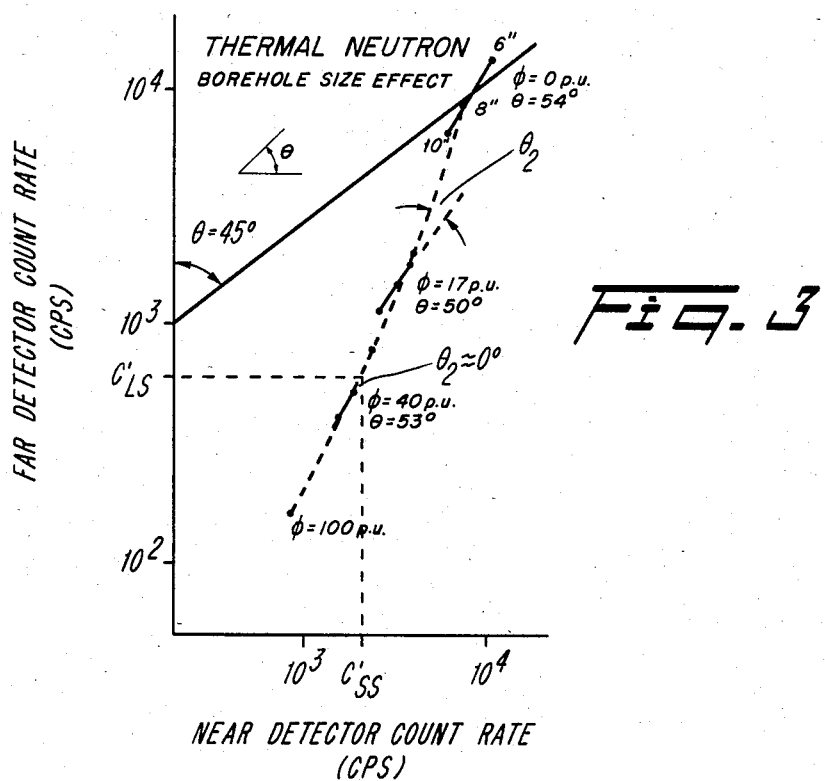
FIG. 3 is a graph relating detected thermal neutron count rates to formation porosity.
Figure 4:
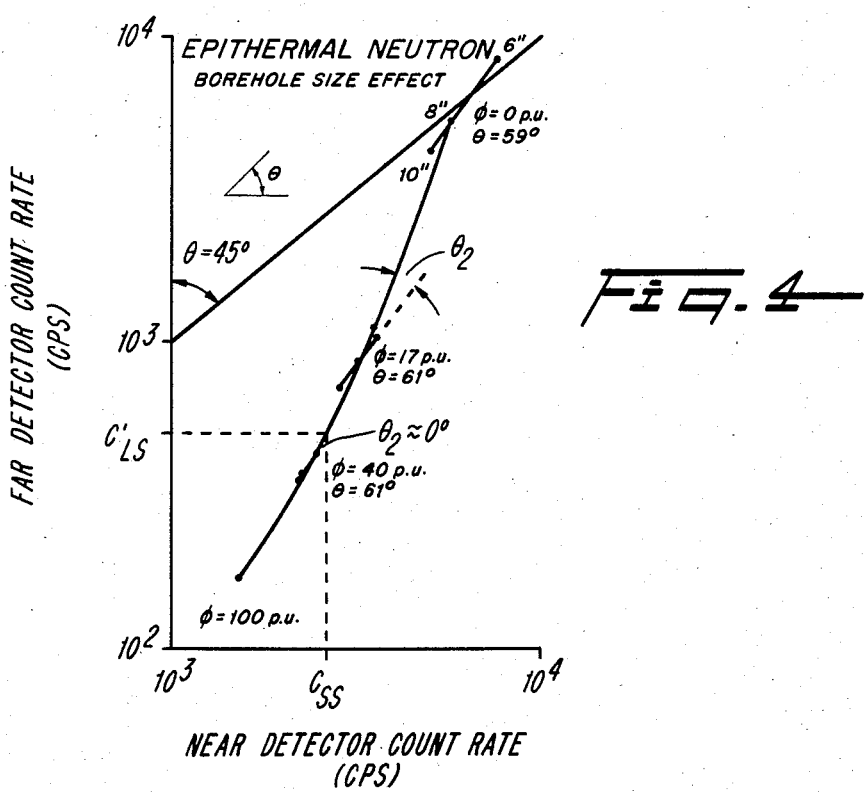
FIG. 4 is a graph relating detected epithermal neutron count rates to formation porosity.

FIGS. 3 and 4 are exemplary of correction charts for thermal and epithermal porosity logging, respectively, taking into account borehole size effect. Each of these graphs depicts that $\theta_2 \approx 0°$ at high values of formation porosity (i.e., above about 40% porosity). At porosity levels of this magnitude and higher, the spine/rib method become undefined for the reasons discussed above. A solution to this problem is not treated in the prior art.

Figure 5:
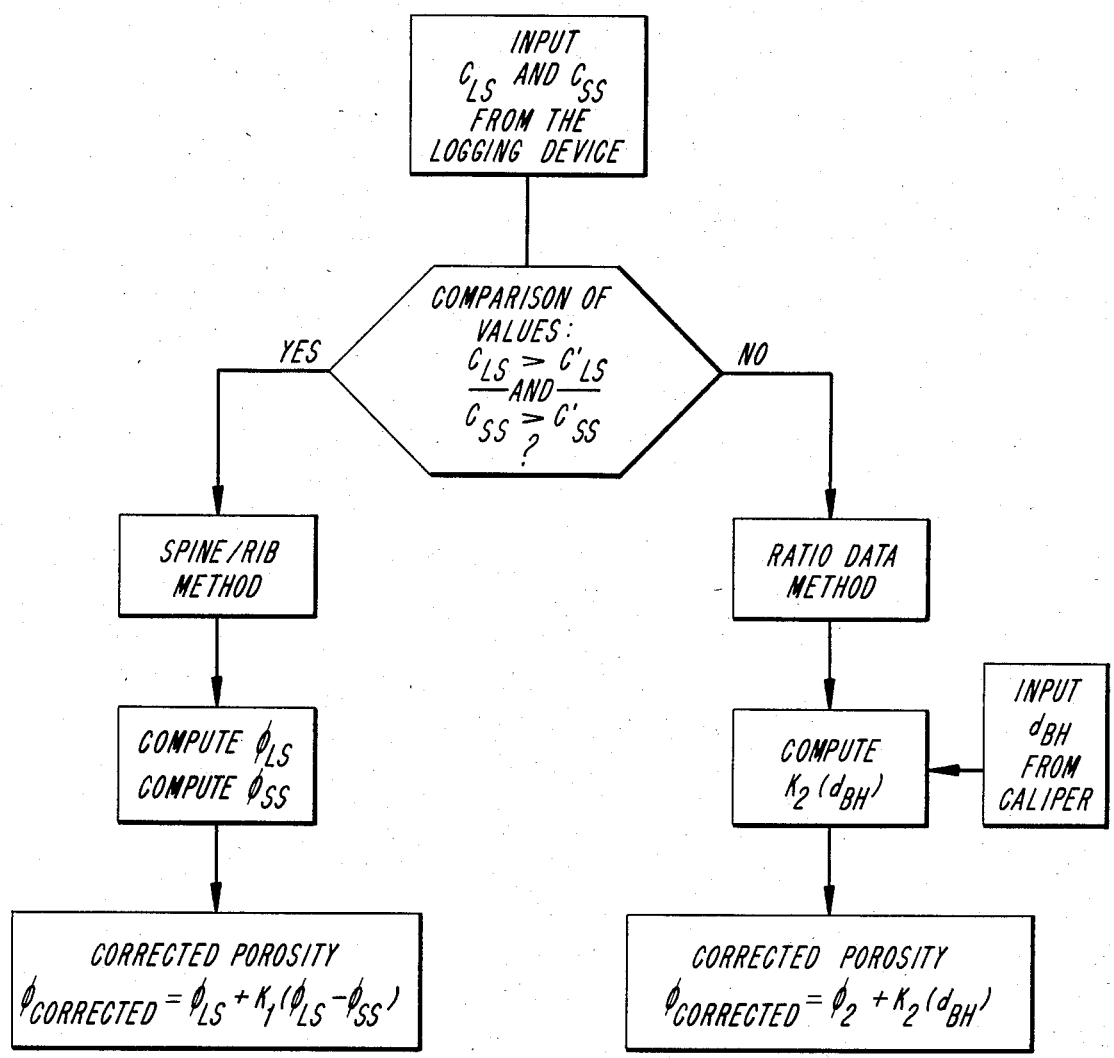
FIG. 5 is a schematic representation of an analytical process of the present invention utilized to select the appropriate method to process the dual detector count rate data.

The well logging techniques of the present invention overcome the borehole correction obstacles when $\theta_2 \approx 0°$. FIG. 5 details in a diagrammatic flow chart the exemplifying techniques which may be used to evaluate dual count rate data. Count rate values $C_{SS}$ and $C_{LS}$ are conveyed to the computer 52. When $C_{SS}$ and/or $C_{LS}$ exceed their respective threshold values $C'_{SS}$ 60, $C'_{LS}$ 62, the spine/rib method is utilized to correct for environmental anomalies existing in the borehole and formation environment. When either of the count rate values $C_{SS}$, $C_{LS}$ does not exceed its respective threshold value, the ratio method is utilized to correct for environmental effects.

When the count rate relationships discussed above dictate the use of the spine/rib method, the data evaluation can be performed in a number of ways. For example, the computer may store in look-up table form pairs of values $C_{SS}$ and $C_{LS}$ (i.e., rib coordinates), and the unique corrected logged parameter which corresponds to the pair (e.g., the porosity value which corresponds to the rib-spine intersection). Alternatively, a number of polynomial equations may be evaluated by the computer 52 in order to provide a borehole or formation parameter corrected for environmental anomalies. These polynomial equations are derived from the equations used, for example, to determine formation porosity in an 8-inch diamter reference "standard" borehole. In the reference "standard" borehole, formation porosity and the other wellbore parameters discussed above may be determined from either $C_{SS}$, $C_{LS}$, or the ratio $C_{SS}/C_{LS}$. The relevant relationships, where $\phi_{SS}$, $\phi_{LS}$ represent "apparent" formation porosities measured by the short spaced and long spaced detectors, respectively, are as follows:

$$\phi_{SS} = x_1 + x_2 C_{SS} + x_3 C^2_{SS} + \ldots + x_n C^{N-1}_{SS}$$

$$\phi_{LS} = y_1 + y_2 C_{LS} + y_3 C^2_{LS} + \ldots + y_n C^{n-1}_{LS}$$

The quantities $X_i$ and $y_i$ are calibration constants determined experimentally in test formations of, in this example, known porosity. These constants may also be calculated using basic neutron transport theory known to those practicing in the art. It may be observed that in these equations the valves $C_{SS}$ and $C_{LS}$ are both employed as independent variables. When $C_{SS}$ is less than $C'_{SS}$ or $C_{LS}$ is less than $C'_{LS}$, a different polynomial may be used to determine a logged parameter from the ratio of long and short-spaced detector count rates. Such a polynomial is exemplified as follows:

$$\phi_R = z_1 + z_2 R + z_3 R^2 + \ldots + z_n R^{n-1}$$

The symbol "R" represents a single variable equal to the ratio $C_{SS}C_{LS}$. The quantities $z_i(i=1, \ldots, n)$ are calibration constants which are determined experimentally in test formations or from neutron transport theory. Formation porosity corrected for environmental conditions may be determined using the spine/rib method from the following relationship:

$$\phi_{corrected} = \phi_{LS} + K_1(\phi_{LS} - \phi_{SS})$$

wherein $K_1$ represents a calibration constant.

When the relationships among $C_{SS}$, $C_{LS}$ and the respective count rate threshold for each dictates the use of the ratio method, the following equation is used to determine the corrected value for the wellbore parameter, which is formation porosity in this example:

$$\phi_{corrected} = \phi_R + K_2(d_{BH})$$

wherein R represents the ratio $C_{SS}/C_{LS}$, $\phi_R$ is determined as noted above, and $K_2(d_{BH})$ represents a correction factor which is a function of the borehole diameter. The functional form of $K_2(d_{BH})$ is determined when the well logging tool is calibrated, but an independent measure of the borehole is required in order to compute the magnitude of $K_2(d_{BH})$. This measure may be performed by running a borehole caliper simultaneously in the logging run.

Tool calibration techniques may be used such that the spine/rib calibration constant $K_1(\phi_{LS} - \phi_{SS})$ may be used to determine borehole diameter. Conversely, when the ratio method is used, $d_{BH}$ must be determined independently in order to correct for a selected parameter, such as porosity.

Although the invention has been described in connection with preferred embodiments, it is understood that variations and modifications may be resorted to as will be apparent to those skilled in the art. Such variations and modifications are to be considered within the purview and the scope of the claims appended hereto.

What is claimed is:

1. An apparatus for logging a characteristic of a borehole in an earth formation employing nuclear count rate data selectively compensated for non-standard borehole conditions, comprising:
    a sonde, moveable in a borehole, having:
        a radiation source for emitting radiation into earth formations adjacent the wellbore;
        first detector, spaced longitudinally from the radiation source, for detecting radiation scattered back to the detector and generating a first signal representative of a first count rate value, $C_{SS}$; and
        second detector spaced a different longitudinal distance from the radiation source, for detecting radiation scattered back to the detector and generating a second signal representative of a second count rate value, $C_{LS}$;
    memory means for storing a predetermined threshold value, first predetermined relationships between the borehole characteristic and count rate values $C_{LS}$, $C_{SS}$; and second predetermined relationships between the borehole characteristic and ratios of $C_{LS}$ to $C_{SS}$;
    electronic means for producing a signal related in value to the borehole characteristic, which electronic means compares at least one of said first and second count rate value signals with the predetermined threshold value, determines when said one count rate value exceeds said threshold, and, in response thereto, produces a first signal representative in value of the borehole characteristic compensated for non-standard borehole conditions according to the first predetermined relationship; said electronic means also determining when said one count rate value is less than said threshold, and, in response thereto, producing a second signal representative in value of the borehole characteristic according to the second predetermined relationship; and
    means for recording the signal generated by the electronic means.

2. The apparatus of claim 1, wherein the predetermined relationship, according to which the first borehole characteristic signal is produced, corresponds to a spine and rib data array in which the spine represents values of the borehole characteristic previously determined for standard conditions and the ribs uniquely relate pairs of values ($C_{SS}$, $C_{LS}$) measured under non-standard conditions to values of the borehole characteristic for standard conditions.

3. The apparatus of claim 1, wherein the predetermined relationship, according to which the second borehole characteristic signal is produced, relates the ratio of the first and second count rate values to the characteristic of the borehole determined under standard conditions.

4. The apparatus of claim 1, wherein the logged borehole characteristic is formation porosity and the non-standard conditions are variation in borehole diameter.

5. The apparatus of claim 1, wherein the predetermined relationship, according to which the first borehole characteristic signal is produced, is a relationship in which the pairs of detected values ($C_{SS}$, $C_{LS}$) correspond to values of formation porosity previously determined under standard conditions.

6. The apparatus of claim 1, wherein the radiation source is a source of fast neutrons.

7. The apparatus of claim 1, wherein the radiation source is an emitter of gamma radiation.

8. The apparatus of claim 1, wherein the first and second detectors detect penetrating radiation scattered from the earth formation.

9. The apparatus of claim 1, wherein the logged borehole characteristic is an indication of formation bulk density.

10. The apparatus of claim 1, wherein the logged borehole characteristic is an indication of casing and cement thickness.

11. The apparatus of claim 1, wherein the logged borehole characteristic is an indication of borehole salinity.

12. The apparatus of claim 1, wherein the logged borehole characteristic is an indication of tool stand-off.

13. The apparatus of claim 1, wherein the logged borehole characteristic is an indication of mudcake thickness.

14. The apparatus of claim 1, wherein the logged borehole characteristic is an indication of mud weight.

15. A method for well logging in an earth formation by employing nuclear count rate data selectively compensated for non-standard conditions in a logged borehole, comprising the steps of:

emitting radiation from a radiation source in a borehole into surrounding earth formations;

detecting at a first longitudinally spaced distance from said source radiation scattered by said formation and generating a first signal representative of a first count rate value;

detecting at a second longitudinally spaced distance from said source radiation scattered by said formation, said second distance being greater than said first distance, and generating a second signal representative of a second count rate value;

comparing at least one of said first and second count rate values with a predetermined threshold value;

determining when said at least one count rate value exceeds said threshold value, and producing, responsive thereto, a first signal representative in value of a pre-selected borehole characteristic compensated for variations from standard conditions according to a predetermined relationship between the borehole characteristic values, determined under standard conditions, and independent variables corresponding to the detected first and second count rate values;

determining when at least one of said count rate values is less than said threshold value, and producing, responsive thereto, a second signal representative in value of the borehole characteristic according to a predetermined relationship between the borehole characteristic values, determined under standard conditions, and a ratio of the first and second count rate values; and recording said first and second wellbore characteristic signals.

16. The method of claim 15, wherein the predetermined relationship, according to which the first borehole characteristic signal is produced, corresponds to a spine and rib data array in which the spine represents values of the borehole characteristic formation bulk density previously determined under standard conditions with a known borehole diameter and the ribs uniquely relate pairs of first and second count rate values measured under non-standard borehole diameter conditions to values of the borehole characteristic located on the spine.

17. The method of claim 16 wherein the emitted radiation is neutrons, and wherein the detected scattered radiation is epithermal neutrons.

18. The method of claim 15 wherein the emitted radiation is neutrons, and wherein the detected, scattered radiation is thermal neutrons.

19. The method of claim 15 including repeating the steps at different depth levels in a wellbore and recording at least one of said signals for each depth to produce an indication of a desired borehole characteristic as a function of borehole depth.

20. An apparatus for providing an indication of the bulk density of an earth formation adjacent a borehole employing nuclear count rate data from at least two detectors, said data being selectively compensated for diameter variations in the borehole, comprising:

a sonde, moveable in the borehole, having:

a radiation source for emitting radiation into earth formations adjacent the borehole;

first detector, spaced longitudinally from the radiation source, for detecting radiation scattered from the earth formation and generating a first signal representative of a first count rate value, $C_{SS}$; and second detector, spaced a different longitudinal distance from the radiation source, for detecting radiation scattered from the earth formation and generating a second signal representative of a second count rate value, $C_{LS}$;

memory means for storing a predetermined first threshold value, $C'_{SS}$; a predetermined second threshold value, $C'_{LS}$; first predetermined relationships between formation bulk density and pairs of count rate values $C_{LS}$, $C_{SS}$; and second predetermined relationships between formation bulk density and ratios of $C_{LS}$ and $C_{SS}$;

electronic means for producing a signal related in value to the bulk density of the formation, which electronic means compares said first count rate value signal $C_{SS}$ with the predetermined first threshold value $C'_{SS}$, compares the said second count rate value $C_{LS}$ with the predetermined second threshold value $C'_{LS}$, determines when both $C_{LS}$ and $C_{SS}$ exceed $C'_{LS}$ and $C'_{SS}$, respectively, and in response thereto produces a signal representative in value of formation bulk density compensated for borehole diameter variations according to the first predetermined relationship; and which electronic means also determines when at least one of $C_{LS}$ and $C_{SS}$ is less than $C'_{LS}$ and $C'_{SS}$, respectively, and in response thereto produces a signal representative in value of formation bulk density according to the second predetermined relationship; and means for recording the signals generated by the electronic means.

* * * * *